United States Patent [19]

Sunthankar

[11] 4,039,998

[45] Aug. 2, 1977

[54] ULTRASONIC TRANSMITTER OR RECEIVER

[75] Inventor: Yeshwant Sadashiw Sunthankar, Washington, England

[73] Assignee: Sunderland Polytechnic, Sunderland, England

[21] Appl. No.: 572,766

[22] Filed: Apr. 29, 1975

[30] Foreign Application Priority Data

Apr. 29, 1974 United Kingdom ............... 18662/74

[51] Int. Cl.² .......................... G01S 9/66; H04R 1/20; H04R 17/10
[52] U.S. Cl. .................................. 340/1 R; 310/330; 310/335
[58] Field of Search ................. 310/8.2, 8.5; 340/1 R, 340/3 A, 8 FT, 15

[56] References Cited

U.S. PATENT DOCUMENTS

| | | | |
|---|---|---|---|
| 2,875,353 | 2/1959 | Cavalieri, Jr. et al. ............... | 310/8.2 |
| 3,525,884 | 8/1970 | Onoe et al. ......................... | 310/8.5 X |
| 3,614,485 | 10/1971 | Cosman et al. ...................... | 310/8.2 |
| 3,846,779 | 11/1974 | Martner ............................. | 310/8.2 X |

OTHER PUBLICATIONS

Sunthankar, The Radio and Electronic Engineer, vol. 42, No. 12, Dec. 1972, pp. 531-536.

Sunthankar, IEEE Trans. Sonics and Ultrasonics, vol. SU-20, No. 3, July 1973, pp. 274-278.

*Primary Examiner*—Richard A. Farley
*Attorney, Agent, or Firm*—Sughrue, Rothwell, Mion, Zinn and Macpeak

[57] ABSTRACT

A directional ultrasonic vibrator has at least one resonant reed, at least one ultrasonic transducer secured to the reed for producing bending moments in the reed along its longitudinal axis, all adapted to perform an operation selected from the group consisting of transmission and reception by the transducer in response to an input electrical signal applied thereto predetermined dimensions and material being employed to permit resonant longitudinal bending vibrations in the reed at a predetermined frequency of said input electrical signal. The parameters are selected with respect to the material and medium in which it is immersed. A blade of two reeds may be employed for symmetrical directional transmission. As an aid to the blind the latter device is used in air with one reed connected as receptor and the device is of a size readily directed in the path of the unsighted for giving an audible warning of approach to potential obstacles while gripped by the unsighted wearer to whose person a box may be strapped containing a power pack and parts of the above equipment.

5 Claims, 3 Drawing Figures

ULTRASONIC TRANSMITTER OR RECEIVER

This invention concerns improvements in and relating to ultrasonic sound transmitting and/or receiving means and more particularly to ultrasonic sound transmitting and/or receiving means having a directional response.

Ultrasonic sound transmitting and/or receiving means are known, for instance piezo electric cells. Simple transmitting and/or receiving means usually transmit or respond to signals over a wide angle around the transducer.

It is an object of the invention to provide an ultrasonic sound transmitting and/or receiving means having a directional response.

According to the invention a directional ultrasonic sound transmitting and/or receiving device comprises at least one resonant reed with at least one ultrasonic transducer secured to the reed for producing bending vibrations in the reed along the longitudinal axis of the reed, the dimensions of the reed and the material of the reed being predetermined to allow resonant longitudinal bending vibrations in the reed at a predetermined frequency of an input electrical signal applied to the transducer.

The reed may be multiple of half wavelengths long and the length is preferably within the range of from 5 to 20 wavelengths; reeds with a greater length generally exhibit great directionality.

The reed may be clamped at one end, which point becomes a node when the reed is vibrated by electrical signals applied to the transducer.

A reflector, being a plane surface extending for at least one wavelength in all directions perpendicular to the axis of the reed, is preferably employed whereby the effective length of the reed may be doubled, due to the 'mirror image' produced by the reflector.

When the transducer is excited by an applied electrical signal it produces bending vibrations in the reed. The material and dimensions of the beam are chosen to allow resonant longitudinal bending vibrations in the reed at the excitation frequency. The thickness of the strip forming the reed effects the bending wave speed of the reed. The length of the reed is chosen to be a multiple of a wavelength and the width of the strip forming the reed is immaterial except that it should be large compared to the thickness and the wavelength to reduce any tendency to develop cross vibrations and after satisfying these conditions may be chosen for mechanical reasons of strength and stiffness of the reed.

The standing waves in a vibrating reed are in antiphase at successive half wavelength intervals. If the wavelength of the vibrations in the reed is the same as the wavelength of the pressure vibrations in the medium surrounding the reed, then constructive interference will occur between the pressure fronts generated by the various points on the reed in a direction along the axis of the reed and destructive interference will occur between the pressure fronts in a direction perpendicular to the reed.

The response pattern of the transmitting or receiving means will have a major lobe in the direction of the wavefront summation and minor lobes in the direction of partial wavefront summations.

The in-line destructive interference of the accoustic radiation from the two sides of the reed causes a null in the direction of the axis of the reed and thus, two major lobes, one on each side of the reed.

To avoid this effect of destructive interference from sound from each side of the reed, an accoustic absorber may be placed at one side of the beam to suppress the radiation from that side.

Two or more reeds may be operated in parallel to provide a stronger radiated sound signal or produce a modified radiated field pattern.

Two specific embodiments of the invention will now be described with reference to the accompanying informal drawings in which FIG. 1 is a view of a single reed ultrasonic sound transmitter or receiver according to the invention.

Figure 1:
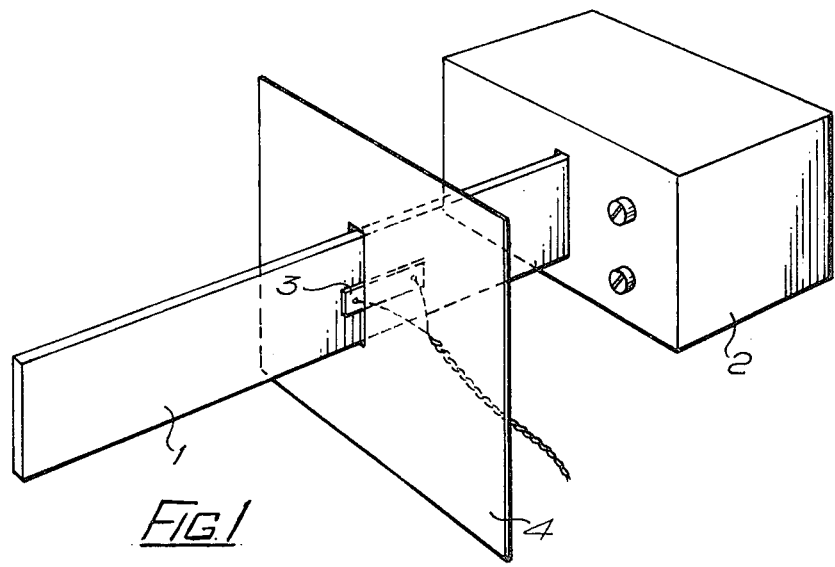

The single reed version has a blade 1 carried in a mounting block 2 with a piezoelectric transducer 3 secured on each face in a position to provide maximum transverse vibrations in the blade. A reflector 4 is positioned to provide the maximum radiated sound level in use.

To produce a major lobe of the radiation field pattern substantially along the axis of the blade, the bending wave speed must be the same as the accoustic wave speed in the surrounding medium. Also the bending wavelength must be the same as the wavelength of the corresponding signal in the surrounding medium.

The bending wavespeed in an infinite reed is given by the relationship.

$$C_b = \frac{2\pi K}{\lambda b} \sqrt{\frac{E}{\rho^{(1-2)}}} = \frac{2\pi K}{\lambda b} C_m$$

Where
$C_b$ = bending wavespeed in reed.
$C_m$ = extensional accoustic wavespeed in reed material.
$K$ = radius of gyration of cross section of beam and for rectangular reed is $0.2887 \times$ thickness $(t)$
$\lambda_b$ = bending wavelength of reed.

The condition for endfire is that $C_b = C_f$ where $C_f$ is accoustic wavespeed in surrounding fluid medium.

$$\text{Thus: } \frac{Cf}{Cm} = \frac{2\pi}{\lambda} \cdot \frac{t}{\sqrt{12}}$$

$$\therefore t = \frac{\sqrt{3}}{\pi} \frac{cf}{Cm}$$

And for the condition that the bending wavelength b equals the wavelength in the surrounding medium f:

$$t = \frac{\sqrt{3}}{\pi} \cdot \lambda \cdot \frac{Cf}{Cm}$$

Thus for a given frequency and surrounding medium.

$$t = \frac{\text{Constant}}{C_m}$$

Too high a value for $C_m$ results in an impractically thin blade.

For a reed blade formed from a brass strip and an operating frequency of 40 KHz. for use in air the blade has the dimensions and constants: $C_m = 3500$ m/s $C_b = C_f = 8.25$ mm. $t = 0.43$ mm. The blade was made 12 wavelengths long (99 mm) and had a breadth of 19 mm.

To avoid destructive interference effects between the two signals radiated from the two faces of the reed blade one signal was suppressed by placing an accoustic absorber near one face. The radiated sound field produced by the blade then had a main lobe of 20° beam width with the strongest side lobes at least 15 dB below the main lobe strength.

The blade and transducer may equally be used as a receiver of ultrasonic sounds at the frequency of resonance of the blade.

Figure 2:
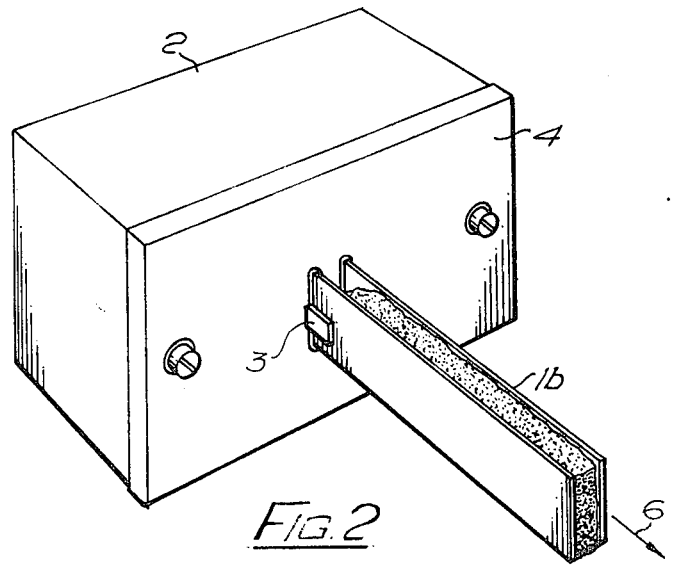
FIG. 2 is a view of a double reed version of the invention.
Figure 3:
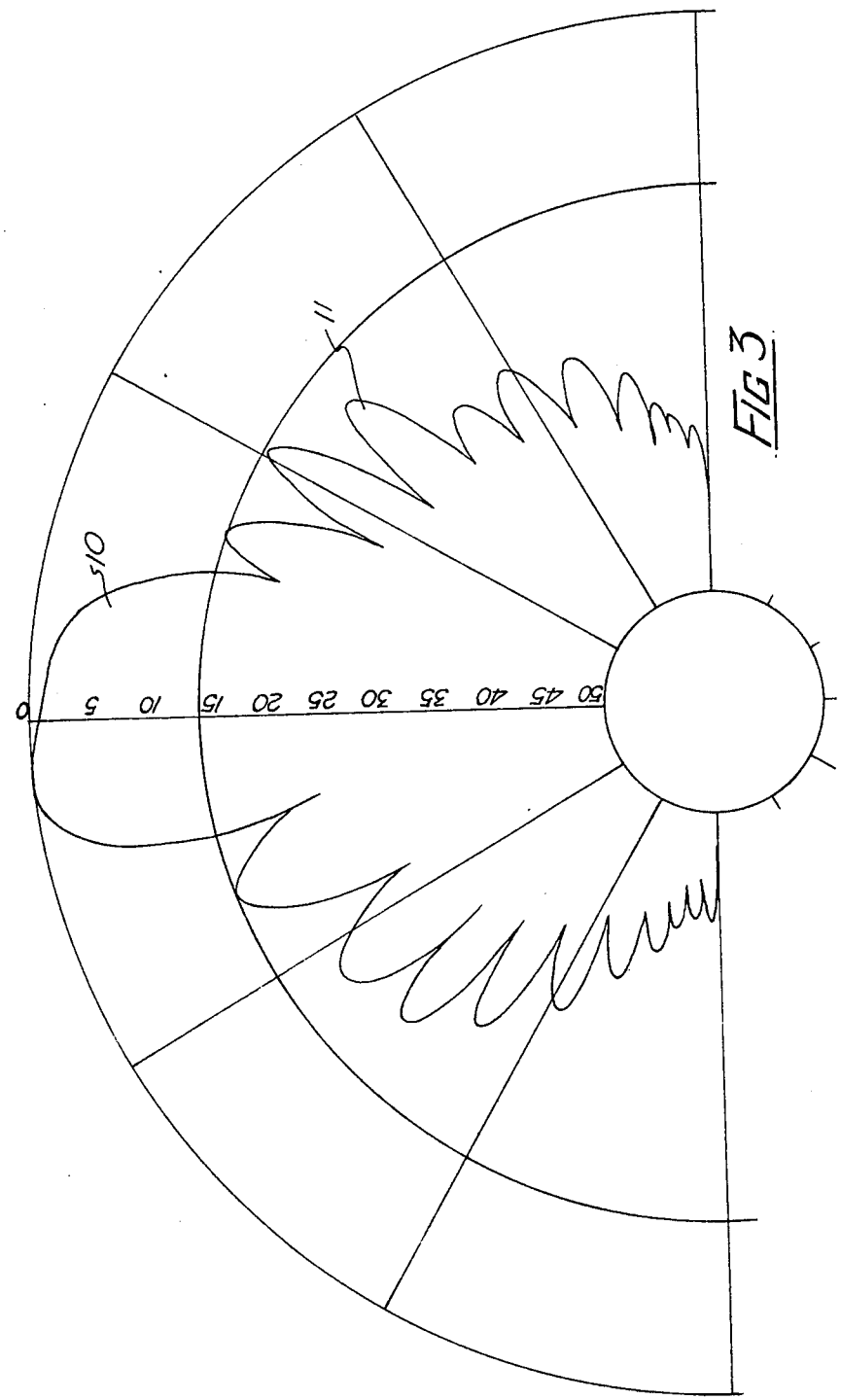
FIG. 3 is a graph of the radiated sound signal strength for the double reed version of the invention.

A two bladed version illustrated in FIG. 2 has two blades $1a$, $1b$ each with two piezo electric transducers 3. The blades are driven in anti phase and emit sound in the direction of arrow 6. A graph of the radiated sound field pattern is illustrated in FIG. 3. This shows a major directional lobe 10 extending forward coaxially with the reed blade, with side lobes 11 of diminishing range towards the plane perpendicular to the blade axis.

As an alternative mode 8 operation the two bladed version, such as illustrated in FIG. 2 may be used with one blade acting as a transmitter, and the other as a receiver which will pick up and resonate the echoes of the signal emitted by the transmitter blades. The face 48 mounting block 2 acts as a reflector. This principle can be used in an aid for the blind, so that obstructions in a path can be detected, or as a security device for detecting intruders. Typically, the receiving blade is connected to a transducer which converts the vibrations into electrical signals, which are amplified, and actuate a warning device, or give some other audible indication of distance, by comparing the time between output and received pulses.

What is claimed is:

1. A directional ultrasonic vibrator operative in a medium comprising: two resonant reeds disposed in a parallel relationship, at least one ultrasonic transducer secured to each reed and adapted for producing bending vibrations in each reed along its longitudinal axis, one of said transducers adapted to be responsive to bending vibrations in one of said reeds, both of said reeds drivable as a pulse emitter and said one of said reeds responsive as a receptor, an acoustic absorber placed between said reeds, a holder supporting said reeds at one end thereof, means in said holder for vibrating said transducers in antiphase with each other, said bending vibrations being of a wavelength matched to the ultrasonic wavelength in said medium, the length of each said reed being matched to a plurality of half said wavelength.

2. A device according to claim 1 wherein the length of each reed is in the range of from 5 to 20 wavelengths.

3. A device according to claim 1 in which each transducer is mounted upon a reflector having a plane surface extending for at least one wavelength orthogonally of said longitudinal axis.

4. A device according to claim 1 having a box in which the holder is carried together with an electrical circuit connected to the transducers and adapted for connection to a power pack.

5. A device according to claim 2 including a reflector having a plane surface extending for at least one wavelength orthogonally of said axis.

* * * * *